(12) United States Patent
Sasaki et al.

(10) Patent No.: US 6,978,681 B2
(45) Date of Patent: Dec. 27, 2005

(54) PRESSURE SENSOR

(75) Inventors: Keiji Sasaki, Tokyo (JP); Hitoshi Nagase, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 44 days.

(21) Appl. No.: 10/832,354

(22) Filed: Apr. 27, 2004

(65) Prior Publication Data
US 2005/0011273 A1 Jan. 20, 2005

(30) Foreign Application Priority Data
Jul. 18, 2003 (JP) ............................. 2003-276477

(51) Int. Cl.⁷ ................................................ G01L 7/00
(52) U.S. Cl. ...................................................... 73/756
(58) Field of Search ........................ 73/700, 756; 338/4

(56) References Cited

U.S. PATENT DOCUMENTS 4,675,643 A * 6/1987 Tanner et al. .................. 338/4

FOREIGN PATENT DOCUMENTS

JP 05-149814 A1 6/1993
JP 3198773 B2 8/2001

* cited by examiner

Primary Examiner—Edward Lefkowitz
Assistant Examiner—Andre Allen
(74) Attorney, Agent, or Firm—Rader, Fishman & Grauer PLLC

(57) ABSTRACT

A pressure sensor comprising a holder 1 having mounted thereto a semiconductor pressure sensor element 2 that outputs a voltage signal corresponding to the pressure it receives, a connector case 3 for fixing a lead member 23 connected to the semiconductor pressure sensor element 21, a diaphragm 4 that defines together with the holder 1 a pressure sensing chamber 6 filled with insulating oil, and a lid member 5 made of metal to which a pressure introduction pipe 51 is mounted, wherein the holder 1 is made of metal and has a through-hole 12 that communicates the pressure sensing chamber 6 with the exterior and a seal member 27 that seals the through-hole 12, the connector case 3 has an insert hole 31 communicated with the through-hole 12 and through which the seal member 27 is inserted, and the diaphragm 4 is sandwiched between the holder 1 made of metal and the lid member 5 made of metal and bonded thereto.

3 Claims, 2 Drawing Sheets

US 6,978,681 B2

PRESSURE SENSOR

FIELD OF THE INVENTION

The present invention relates to a pressure sensor, and specifically, relates to a pressure sensor comprising a holder, connector case, diaphragm and lid member, and having a fluid filled in a pressure sensing chamber storing a pressure sensing element.

DESCRIPTION OF THE RELATED ART

Heretofore, various types of semiconductor pressure sensors have been proposed according to which a fluid is filled in a pressure sensing chamber storing the semiconductor pressure sensor element and pressure from the exterior is transmitted to the semiconductor pressure sensor element stored in the pressure sensing chamber via the fluid, and the pressure sensor element outputs a voltage signal corresponding to the pressure it receives (refer to Patent Document 1).

Further, Patent Document 2 discloses a semiconductor pressure sensor comprising a sensor having circuit elements of a strain gage and a signal processing circuit integrated on a semiconductor element body, and the sensor is disposed in a space surrounded by a seal diaphragm and a container and filled with insulating oil such as silicon oil.

The prior art pressure sensing elements and semiconductor pressure sensors having the signal processing circuit disposed within the filled fluid fail to consider improving the airtightness or reducing the number of assembly processes.
Patent Document 1: Japanese Patent No. 3198773 Patent Document 2: Japanese Patent Application Laid-Open No. 5-149814

SUMMARY OF THE INVENTION

The present invention aims at solving the problems of the prior art, and provides a pressure sensor having advanced airtightness and also having a firm bond between the holder and the lid member.

The pressure sensor according to the present invention comprises a holder having mounted thereto a semiconductor pressure sensor element that outputs a voltage signal corresponding to a received pressure, a connector case for fixing a lead member electrically connected to the semiconductor pressure sensor element, a diaphragm defining together with the holder a pressure sensing chamber filled with an insulating oil, and a lid member made of metal having mounted thereto a pressure introduction pipe, wherein the holder is made of metal and has a through-hole communicating the pressure sensing chamber with the exterior and a seal member that seals the through-hole; the connector case has an insert hole communicating with the through-hole and through which the seal member is inserted; and the diaphragm is sandwiched between and fixed to the holder made of metal and the lid member made of metal.

Further according to the pressure sensor of the present invention, the holder has mounted thereto a substrate mounting the semiconductor pressure sensor element that outputs a voltage signal corresponding to the received pressure.

According further to the pressure sensor of the present invention, the holder and the lid are fixed together by welding.

The present invention provides a pressure sensor having increased airtightness, and since the pressure sensor comprises as its main components a holder, a connector case, a diaphragm and a lid member, the structure of the assembled pressure sensor can be simplified. Furthermore, since the diaphragm is sandwiched between the holder and the lid member, the pressure sensor has improved assembling characteristics.

DETAILED DESCRIPTION OF THE PREFERRED EMBODIMENT

Figure 1:
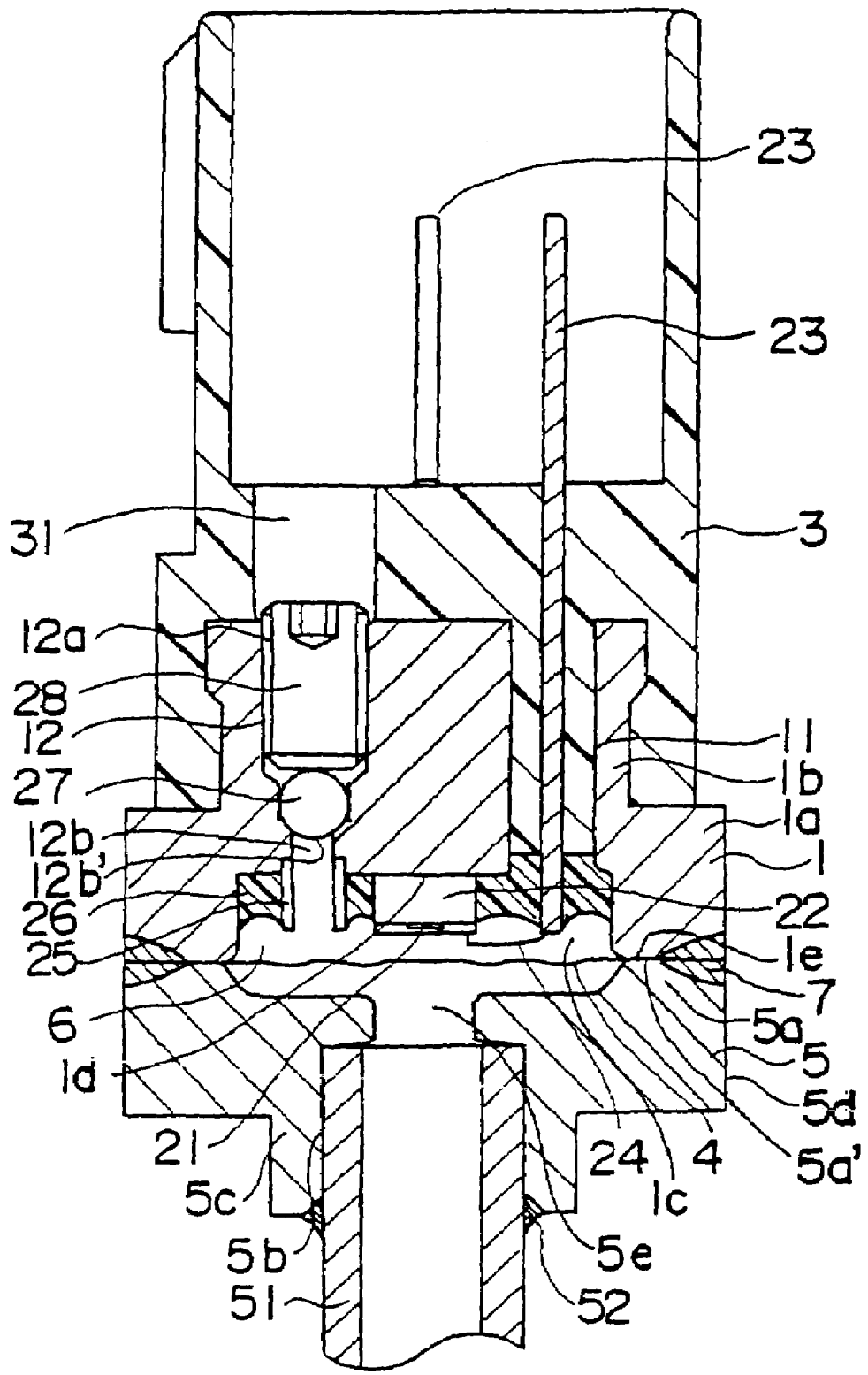
FIG. 1 is a vertical cross-sectional view showing the structure of a pressure sensor according to embodiment 1.
Figure 2:
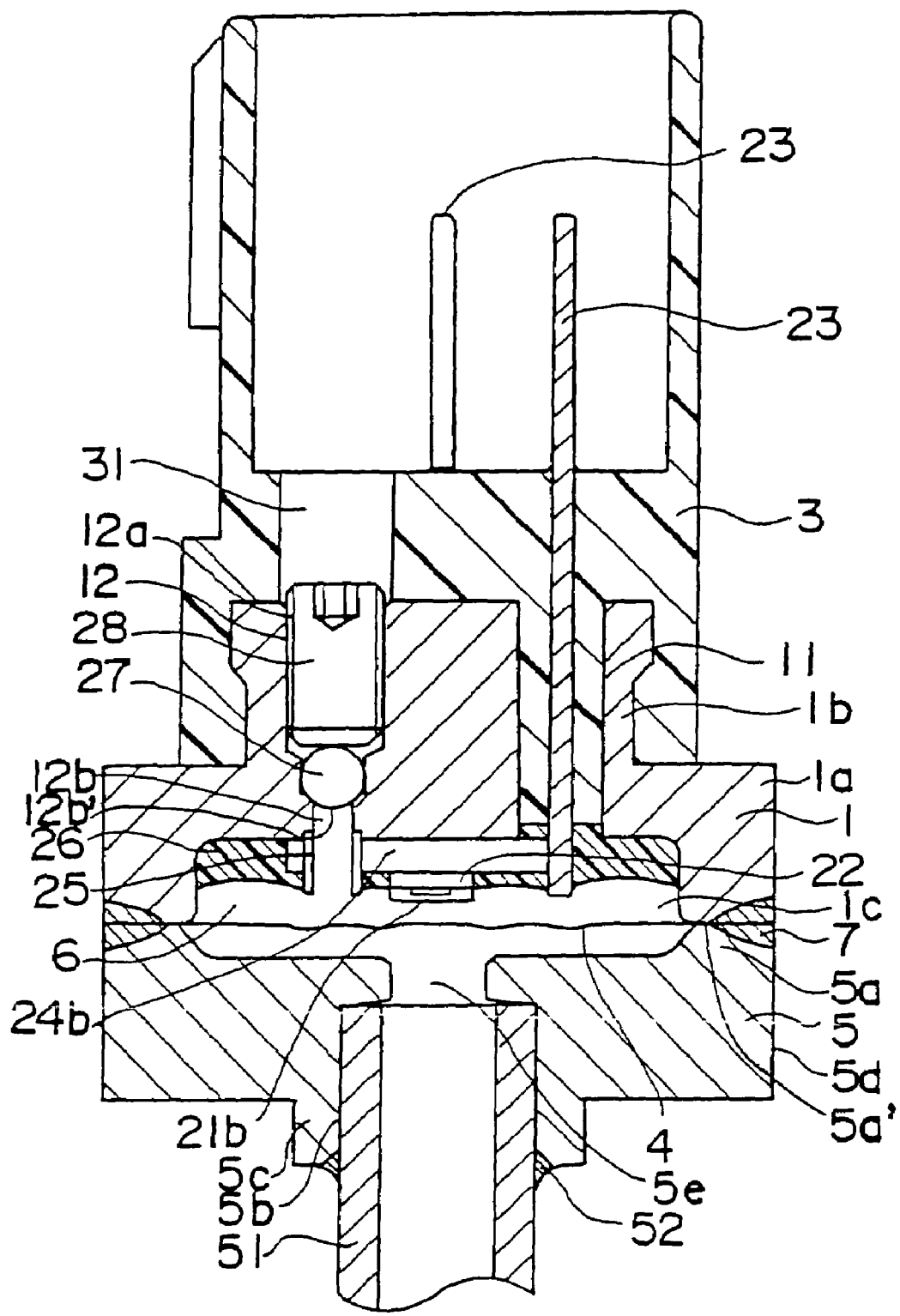
FIG. 2 is a vertical cross-sectional view showing the structure of a pressure sensor according to embodiment 2.

Now, the best mode for carrying out the present invention will be explained. The preferred embodiments of the pressure sensor according to the present invention will be explained with reference to FIGS. 1 and 2. FIG. 1 is a vertical cross-sectional view showing the structure of the pressure sensor according to a first embodiment. FIG. 2 is a vertical cross-sectional view showing the structure of the pressure sensor according to a second embodiment.

Embodiment 1

The first embodiment of the pressure sensor according to the present invention will be explained. As shown in FIG. 1, the pressure sensor according to the present embodiment comprises a holder 1, a connector case 3, a diaphragm 4 and a lid member 5.

The holder 1 is made of metal such as stainless steel, and comprises a disk-shaped base portion 1a and a cylindrical column portion 1b formed integrally to the inner side of the base portion and defining in its interior a space that functions as a pressure sensing chamber 6. To the column portion 1b are formed a through-hole 12 having a large-diameter portion 12a and a small-diameter portion 12b, and an outlet 11 in which a lead member 23 is disposed, both of which are formed vertically to the housing, that is, perpendicular to the diaphragm 4. In the through-hole 12, a first seal member 27 and a second seal member 28 are disposed. The small-diameter portion 12b of the through-hole 12 is communicated with the pressure sensing chamber 6, and the lower end of the lead member 23 inserted to the outlet 11 is projected into the pressure sensing chamber 6.

Inside the pressure sensor chamber 6 of the holder 1, a semiconductor pressure sensor element 21 is disposed via a seat 22 on a lower surface 1d of the holder 1, and the above-mentioned lower end of the lead member 23 is electrically connected to the sensor element via wire bonding and a lead wire 24.

A connector case 3 is connected to the holder 1 via insert molding to the base 1a of the holder 1, the connector case 3 fixing the lead member 23 and having an insert hole 31 that communicates with the through-hole 12. The holder 1 and the connector case 3 are in contact with each other, with no gap formed therebetween. A disk-shaped diaphragm 4 is fixed by welding between a lower contact surface 1e of the base portion 1a of the holder 1 and an upper surface 5a' of a raised portion 5a of a lid member 5 made of metal, and the diaphragm 4 together with the interior space 1c of the holder 1 defines the pressure sensing chamber 6.

The holder 1 is equipped with multiple lead member outlets 11 and through-holes 12. The lead member 23 connected electrically to the semiconductor pressure sensor element 21 is inserted to the lead member outlet 11. Insulating oil is filled through the through-hole 12, and thereafter, a first seal member 27 is inserted to the through-hole 12 and a second seal member 28 coming in contact with the first seal member is screwed onto the through-hole 12, by which the pressure sensing chamber 6 is maintained airtight. Further, it is possible to use only one seal member, the first seal member.

Inside the pressure sensing chamber 6, a semiconductor pressure sensor element 21 is fixed via a seat 22 on the bottom surface of holder 1. The semiconductor pressure sensor element 21 comprises a piezoresistance constituting a bridge circuit and a circuit surrounding the piezoresistance for processing electric signals, and outputs a voltage signal corresponding to the pressure it receives. The semiconductor pressure sensor element 21 is exposed to the pressure within the pressure sensing chamber 6. The semiconductor pressure sensor element 21 is connected to a circuit disposed outside the pressure sensor through the lead member 23.

By performing insert molding of the connector case 3 made of resin to the holder 1, the lead member 23 will be disposed in the lead member outlet 11 of the holder 1 and a pipe member 25 will be inserted to the through-hole 12, which are respectively fixed to position in airtight fashion by a seal member 26 containing an adhesive or a resin seal.

The connector case 3 is fit to the holder 1 by insert molding, and the lead member 23 connected to the semiconductor pressure sensor 21 is fixed to the connector case 3. If necessary, the lead member 23 can have a bent portion inside the connector case 3 which prevents the lead member from being pulled out of the connector case 3. The connector case 3 is a substantially cylindrical structure made for example of PPS resin. The connector case 3 has formed thereto a vertical insert hole 31 that communicates with the through-hole 12, and through the insert hole 31 the first seal member 27 and the second seal member 28 are inserted and disposed in the through-hole 12. According to this structure, the seal members are disposed vertically in the holder 1 and connector case 3, and will not be seen easily from the exterior.

Insulating oil such as fluorine-based oil or silicon oil is filled via the insert hole 31 of the connector case 3 to the pressure sensing chamber 6 to act as pressure transfer medium, then a ball 27 made of metal such as stainless steel functioning as the first seal member is press-fit through the insert hole 31 to the small-diameter portion 12*b* of the through-hole 12 and comes into contact with an end portion 12*b*' of the small-diameter portion 12*b*, and thereafter, a screw member 28 functioning as the second seal member is screwed onto the inner surface of the large-diameter portion 12*b* of the through-hole 12, the screw member 28 pressing the ball 27 so as to seal the pressure sensing chamber 6 together with the diaphragm 4. Further, the area surrounding the semiconductor pressure sensing element 21, the end of the lead member 23 and the inner surface of the interior space 1*c* of the pressure sensing chamber 6 are sealed airtightly by a seal member 26 such as an adhesive. In the present embodiment, a metal pipe member 25 formed as a separate member is interposed between the through-hole 12*a* and the adhesive.

The diaphragm 4 is a thin plate made for example of stainless steel, and has a disk-like shape. The diaphragm 4 is sandwiched between and held by the holder 1 and the lid member 5, and welded thereto via TIG welding, plasma welding or laser welding in a firm and airtight manner.

The lid member 5 is a substantially disk-shaped member made of metal such as stainless steel, comprising a disk portion 5*d*, a raised portion 5*a* and a lowered portion 5*c* formed integrally thereto, and the pressure sensing chamber 6 is maintained airtight so as to detect via a pressure transfer space 5*e* the pressure introduced thereto through a pressure introduction pipe 51 connected to a pressure introduction hole 5*b* formed to the lowered portion 5*c*. The pressure introduction pipe 51 is fixed to the lowered portion 5*c* via a weld portion 52, and the pressure transfer space 5*e* is defined by the raised portion 5*a* and the diaphragm 4.

Now, the method of how the diaphragm 4 is sandwiched between and supported by the holder 1 and the lid member 5 is explained. In order to improve the airtightness of the pressure sensing chamber 6 defined by the holder 1 and diaphragm 4, the circumference of diaphragm 4 is sandwiched between the holder 1 and the lid member 5, and in this state the holder 1 and lid member 5 are welded together. By forming the weld portion between the holder 1 and lid member 5 to be flushed, the connections between the holder 1 and lid member 5 and between the holder 1 and diaphragm 4 become secure, and thus the airtightness of the pressure sensing chamber 6 is increased. Moreover, since the holder 1, the lid member 5 and the diaphragm 4 are all made of metal, they can be joined together completely and firmly through welding.

One example of how the pressure sensor according to embodiment 1 is assembled will now be explained. First, the connector case 3 having the lead member 23 fixed thereto is fit to holder 1. Then, the lead member 23 is fixed to the lead member outlet 11 and the pipe member 25 is fixed to the through-hole 12, respectively, through use of a hermetic seal. The semiconductor pressure sensor element 21 and the seat 22 are bonded to the bottom portion of the holder 1, and the semiconductor pressure sensor element 21 and the lead member 23 are electrically connected via a bonding wire 24.

On the other hand, the pressure introduction pipe 51 is brazed onto the opening of the lid member 5. Then, the holder 1 and the lid member 5 are set to sandwich the diaphragm 4 therebetween, and the three members are connected airtightly by welding and integrated.

Thereafter, a fluorine-based oil or a silicon oil is poured through the through-hole 12 into the pressure sensing chamber 6 defined by the diaphragm 4 and holder 1 so as to fill the chamber, then the first seal member or ball 27 is inserted to the through-hole 12 and the second seal member or screw 28 is screwed and fixed to the through-hole 12 to thereby seal the hole 12. Thus, the pressure sensor according to embodiment 1 is formed. Further, by press-fitting the first seal member (ball) 27 to the through-hole 12 and securing the same to position by pressure, the second seal member (screw) 28 can be omitted. Further, the pipe 25 is disposed only if necessary, and it can also be omitted.

It is also possible to weld the holder 1 and lid member 5 together after filling the fluid.

Thus, a pressure sensor having advantageous airtightness can be manufactured using smaller number of parts and less manufacturing processes.

Embodiment 2

Now, the second embodiment of the pressure sensor according to the present invention will be explained. According to the present embodiment, the structure of the semiconductor pressure sensor element differs from that of the first embodiment, and as shown in FIG. 2, the semiconductor pressure sensor element 21*b* constituting a bridge circuit is mounted on a substrate 24*b* via a seat 22. The semiconductor pressure sensor element 21*b* detects pressure and generates a voltage signal, and the substrate 24*b* that constitutes a circuit unit for processing the voltage signal is fixed onto the lower surface of the holder 1 within the pressure sensor chamber 6. The circuit unit is electrically connected to the semiconductor pressure sensor element 21b, and the lead member 23 is electrically connected to the substrate 24b. Moreover, the surface of substrate 24b is covered with an adhesive or resin seal 26. The other structures are similar to that of embodiment 1 shown in FIG. 1, so the identical components are denoted by the same reference numbers, and the explanations thereof are omitted.

What is claimed is:

1. A pressure sensor comprising a holder having mounted thereto a semiconductor pressure sensor element that outputs a voltage signal corresponding to a received pressure, a connector case for fixing a lead member electrically connected to the semiconductor pressure sensor element, a diaphragm defining together with the holder a pressure sensing chamber filled with an insulating oil, and a lid member made of metal having mounted thereto a pressure introduction pipe, wherein the holder is made of metal and has a through-hole communicating the pressure sensing chamber with the exterior and a seal member that seals the through-hole;

the connector case has an insert hole communicating with the through-hole and through which the seal member is inserted; and the diaphragm is sandwiched between and fixed to the holder made of metal and the lid member made of metal.

2. The pressure sensor according to claim 1, wherein the holder has mounted thereto a substrate mounting the semiconductor pressure sensor element that outputs a voltage signal corresponding to the received pressure.

3. The pressure sensor according to claim 1, wherein the holder and the lid are fixed together by welding.

* * * * *